(12) United States Patent
Wells et al.

(10) Patent No.: US 7,426,573 B2
(45) Date of Patent: Sep. 16, 2008

(54) SYSTEM AND METHOD FOR PROVIDING SERVICE AVAILABILITY DATA FOR A COMMUNICATION NETWORK

(75) Inventors: Donald J. Wells, Ottawa (CA); Peter C. Dippel, Stittsville (CA); Shawn McAllister, Manotick (CA)

(73) Assignee: Alcatel Lucent, Paris (FR)

( * ) Notice: Subject to any disclaimer, the term of this patent is extended or adjusted under 35 U.S.C. 154(b) by 1341 days.

(21) Appl. No.: 10/012,428

(22) Filed: Dec. 12, 2001

(65) Prior Publication Data
US 2003/0110408 A1 Jun. 12, 2003

(51) Int. Cl.
G06F 15/173 (2006.01)
(52) U.S. Cl. ...................................... 709/238
(58) Field of Classification Search ................. 370/229, 370/252, 352, 356, 372, 385, 389, 395.5, 370/357, 397, 395.4, 409, 395.21; 714/1–57; 709/223, 224, 226, 238
See application file for complete search history.

(56) References Cited

U.S. PATENT DOCUMENTS

| | | | | |
|---|---|---|---|---|
| 5,276,440 A | * | 1/1994 | Jolissaint et al. | 340/825.02 |
| 5,627,766 A | * | 5/1997 | Beaven | 702/122 |
| 5,745,693 A | | 4/1998 | Knight et al. | |
| 5,790,431 A | * | 8/1998 | Ahrens et al. | 718/104 |
| 5,841,972 A | * | 11/1998 | Fanshier | 709/220 |
| 6,229,787 B1 | * | 5/2001 | Byrne | 370/218 |
| 6,272,107 B1 | * | 8/2001 | Rochberger et al. | 370/216 |
| 6,295,541 B1 | * | 9/2001 | Bodnar et al. | 707/203 |
| 6,304,549 B1 | * | 10/2001 | Srinivasan et al. | 370/230 |
| 6,385,198 B1 | * | 5/2002 | Ofek et al. | 370/389 |
| 6,446,058 B1 | * | 9/2002 | Brown | 706/60 |
| 6,574,244 B1 | * | 6/2003 | Petrie et al. | 370/503 |
| 6,594,786 B1 | * | 7/2003 | Connelly et al. | 714/50 |
| 6,608,817 B1 | * | 8/2003 | Ivory | 370/250 |
| 6,643,267 B1 | * | 11/2003 | Karia et al. | 370/252 |
| 2002/0131362 A1 | * | 9/2002 | Callon | 370/216 |
| 2003/0149919 A1 | * | 8/2003 | Greenwald et al. | 714/43 |

OTHER PUBLICATIONS

Wang et al. IP Multicast Fault Recovery in PIM over OSPF. ACM Sigmetrics Performance Evaluation Review. vol. 28. Issue 1. Jun. 2000. pp. 106-107.*

* cited by examiner

*Primary Examiner*—Andrew Caldwell
*Assistant Examiner*—Grant Ford

(57) ABSTRACT

The present invention provides a system and method of calculating a service disruption in a communication network comprising network elements, including nodes connected via links and at least one originating node. Each node is able to detect a failure in an adjacent network element. Upon detection of a failure, a first timestamp is generated. The detecting node generates a release signal which is transmitted, together with the first timestamp, to an originating node which releases the affected connection. The originating node establishes a new connection and initiates a new call. Upon establishing a new connection, a node affected by the failure, which forms a part of the new connection, records a second timestamp. The second timestamp is chosen to reflect, as closely as possible, the actual time of restoration of service in the network. Service disruption is measured as a difference between the first and second timestamps.

11 Claims, 8 Drawing Sheets

| Message Type | Release |
|---|---|
| Network Call ID | xxxxxxx |
| Cause Code | xxxxx |
| Network Event Code | Time / xx:xx:xx |
| | Event Identifier / xxx |
| | |

FIG. 6A

| Message Type | Connect |
|---|---|
| Network Call ID | xxxxxxx |
| Cause Code | xxxx |
| Network Event Code | Time / xx:xx:xx |
| | |

FIG. 6B

SYSTEM AND METHOD FOR PROVIDING SERVICE AVAILABILITY DATA FOR A COMMUNICATION NETWORK

FIELD OF THE INVENTION

The invention relates generally to a system and method for providing service availability data relating to transmissions processed by a node in a communication network.

BACKGROUND OF INVENTION

In a communication network operated by a service provider, the service provider offers bandwidth in the network to customers. The service provider typically has a Service Level Agreement (SLA) with its customer, whereby the service provider commits to provide communication services with service level guarantees to the customer and receives compensation according to the payment schedule in the SLA as long as the provider achieves its service commitments. SLAs commonly include penalties when service commitments are not met, for example, as a result of a link failure in the network. During a subsequent network recovery period, service to a customer is disrupted. Accordingly, there is a need for accurate tabulation and measurement of service outage times for the customer.

The communication network, or more particularly a portion thereof, may fail for various reasons, including a software defect or equipment failure. When a failure is sensed by other network elements adjacent to the failed portion of the network, signalling standards may require that all calls affected by the failure should be released, thus causing all of the bearer channel cross-connects relating to those calls to be released. If a call control entity (for example, a call processor supporting switched virtual circuits or SPVC services) on a first network element fails, all of the signalling interfaces with other network elements managed by the call processor will be lost Adjacent network elements or nodes will thus presume that the bearer channels associated with the failed signalling interfaces are no longer operable. This causes the adjacent network elements or nodes to signal this status across the network and release all cross-connects to the bearer channels composing the call. Ultimately, the failure in the signalling network will be signalled back to the calling and called services, which terminate their sessions.

A similar situation occurs upon the failure of a network link or line card module carrying user traffic. The failure of this link or card is detected by the network elements which then release all cross-connects for the bearer channels composing the calls.

As the number of connections across a physical link increases in a communication network, so does the time required to release, reroute and restore these connections in the event of a failure of a network element. In a signalled network, for example, the rate of restoration varies by network but may be in the order of, say, 100-1000 connections per second. Therefore, rerouting a large number of connections of 10,000, for example, may require (in an ideal, uncongested network) 10-100 seconds to complete. Also, as the number of connections traversing a single physical entity (link or node) increases, the restoration time increases. Furthermore, the number of physical entities through which release messages must traverse toward the originating or source nodes for each connections being rerouted impacts the delay in restoring the connections. From an SLA perspective, the outage time recorded should accurately represent the duration for which each traffic-carrying connection is unavailable.

In typical prior art systems and methods, service downtime is measured from the viewpoint of a source node, using only that source node's clock, as that source node receives a release message and a subsequent connect message. Therefore, propagation delays for release messages arriving at the source nodes, and queuing of release messages at each intermediate node before processing, are not measured as part of the downtime. This untracked propagation delay and queuing time can represent a significant portion of the total time that service to a customer is disrupted. As a result, typical prior art systems and methods for measuring service outage times do not scale well in larger networks due to the increasing network database size and message traffic.

Thus, there is a need for a system and method for providing service availability data that improves upon the prior art systems.

SUMMARY OF INVENTION

In an aspect of the invention, a method of calculating an elapsed time related to establishing a new connection between an originating node and a destination node in a switched communication network after a previously established connection between the originating node and the destination node has had a failure is provided. The method comprises (i) recording a first timestamp corresponding to a time of the failure in the previously established connection; (ii) recording a second timestamp corresponding to a time of completion of establishment of the new connection; (iii) collecting the first and second timestamps; and (iv) calculating the elapsed time utilizing the first and second timestamps.

The method may have step (i) performed at an adjacent node to the failure in the previously established connection; and step (ii) performed at a node in the new connection. Further, step (i) may also transmit the first timestamp to another node in the switched communication network utilizing a release message corresponding to the failure. Yet further still, the method may have for step (ii) the time of completion of establishment of the new connection comprising a time of receipt of a connect message corresponding to completion of the new connection including the node affected by the failure. Further still, the method may have the time of the failure and the time of completion of establishment of the new connection are synchronized to a common network time utilized by the switched communication network and may have step (iv) calculating a difference between the first timestamp and the second timestamp. Yet further still, the method may have the common network time as being coordinated universal time (UTC).

Also, for the method, each of the time of the failure and the time of completion of establishment of the new connection may be synchronized according to a local time zone associated with a common network time; and step (iv) may convert the first and second timestamps to a common time format relating to the common network time before calculating a difference between them. The common network time may be coordinated universal time (UTC).

Alternatively still, step (iii) may be performed at a central collecting node. Also, the time of the failure and the time of completion of establishment of the new connection may be synchronized to a common network time utilized by the switched communication network; and step (iv) may calculate a difference between the first timestamp and the second timestamp. Again, the common network time may be co-ordinated universal time (UTC).

Also, each of the time of the failure and the time of completion of establishment of the new connection may be synchronized according to a local time zone associated with a common network time; and step (iv) may convert the first and second timestamps to a common time format relating to the common network time before calculating a difference therebetween. Again, the common network time may be co-ordinated universal time (UTC).

In a second aspect, a method of calculating an elapsed time between network events is provided. The network events are related to establishing a new connection between an originating node and a destination node through a new connection in a switched communication network after a previously established connection between the originating node and the destination node through a previously established connection in the switched communication network has had a failure in the previously established connection. The method comprises the steps of: (i) generating a first network event associated with the failure in the previously established connection; (ii) establishing a first timestamp corresponding to a time of occurrence of the first network event; (iii) generating a second network event associated with establishing the new connection; (iv) establishing a second timestamp corresponding to a time of occurrence of the second network event; (v) collecting the network events; and (vi) calculating the elapsed time between network events utilizing the first and second timestamps associated with the network events.

Further, the method may perform step (ii) at an adjacent node to the failure in the previously established connection; and step (iv) at a node affected by the failure which also forms part of the new connection. Yet further still, for step (i), the first network event may also be inserted into a release message. Also, the method may include step (vii) which propagates the release message to each node affected by the fault, including originating nodes of any connections affected by the fault.

In a third aspect, a system for calculating an elapsed time related to establishing a connection between an originating node and a destination node through a connection in a switched communication network after a previously established connection between the originating node and the destination node through a previously established connection in the switched communication network has had a failure in the previously established connection is provided. The system comprises a first module adapted to generate a first timestamp associated with a time of the failure in the previously established connection; a second module adapted to generate a second timestamp associated with a second time of completion of the connection through the connection; a collector for collecting the first and second timestamps; and a calculator for calculating an elapsed time based on the first and second timestamps.

The system may have the collector as a central timestamp collecting node.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 6A is a block diagram of an exemplary release message having an available information element for inserting a first timestamp; and FIG. 6B is a block diagram of an exemplary connect confirmation message having an available information element for inserting a second timestamp.

DETAILED DESCRIPTION OF THE EMBODIMENTS

Figure 1:
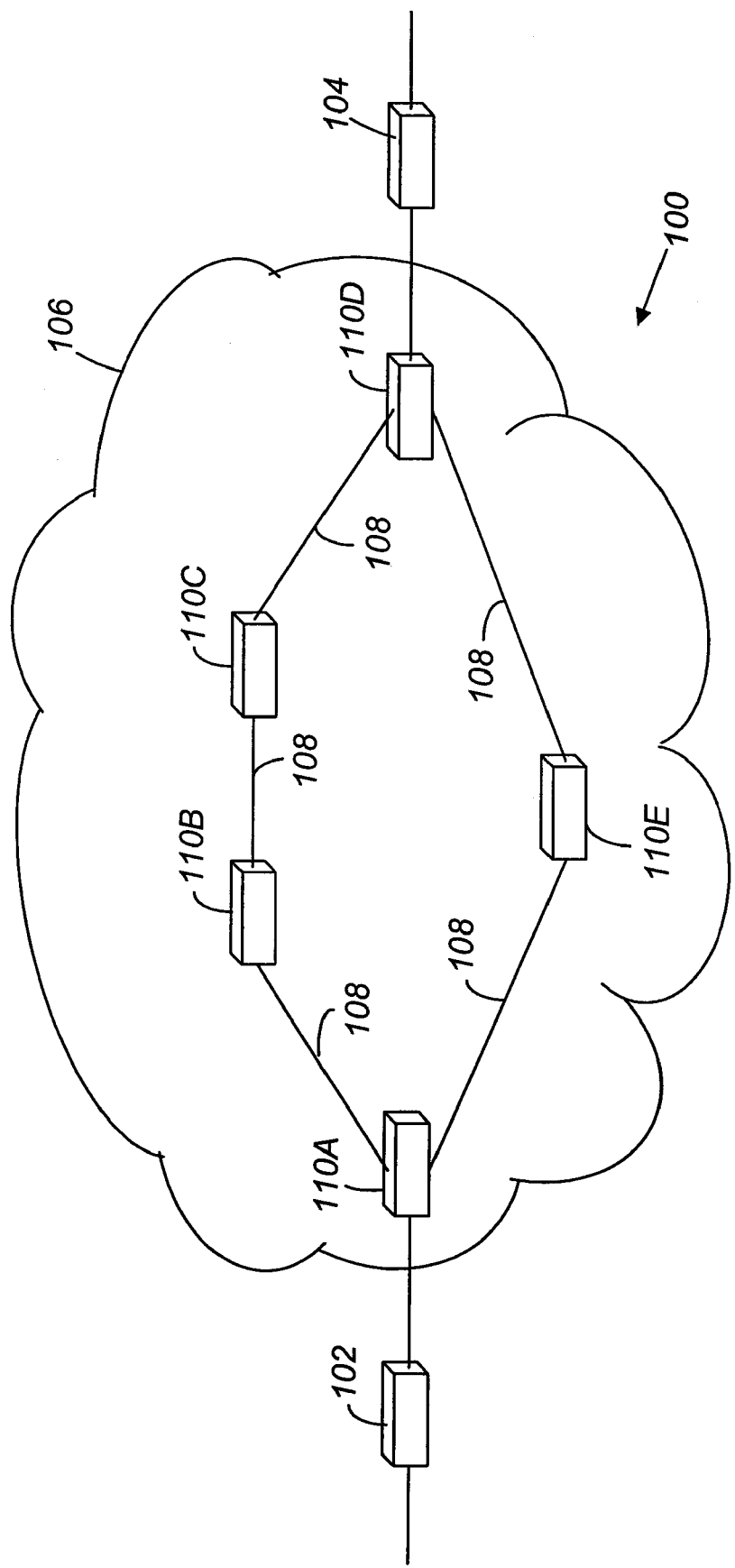
FIG. 1 is a block diagram of a communication network in which a system and method embodying the invention may be practiced.

The description which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following is a description of a network associated with the embodiment.

Referring to FIG. 1, a communication network 100 is shown. Network 100 allows an originating or source node 102 to communicate with a destination node 104 through network cloud 106. More specifically, the source node 102 is connected to a plurality of switching nodes 110A . . . 110E within network cloud 106. Switching nodes 110A . . . 110E form the communication backbone of network cloud 106. In turn, the plurality of switching nodes 110A . . . 110E are connected to the destination node 104 on the other side of network cloud 106.

Still referring to FIG. 1, the ports on the switching nodes 110A . . . 110E may be physically interconnected by physical interconnectors or links 108. The links 108 may comprise, for example, standard physical interfaces such as OC-3, OC-12 or DS3.

The links 108 between nodes 110A . . . 110E allow a plurality of connections for communication sent between the source node 102 and the destination node 104. As a simplified example, one datapath is provided by nodes 110A-110B-110C-110D and another datapath is provided by nodes 110A-110E-110D.

Figure 2:
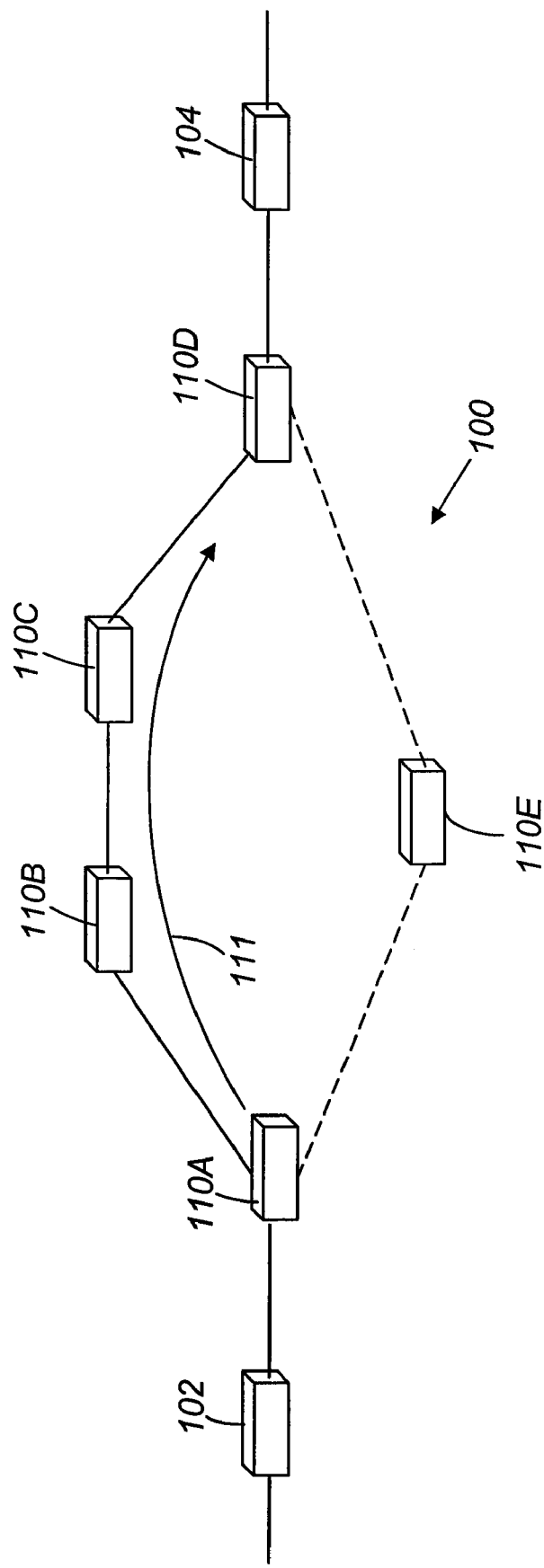
FIG. 2 is the communication network of FIG. 1 in which normal data transmission service is active.

Now referring to FIG. 2, data traffic is flowing through a bearer channel provided by nodes 110A-110B-110C-110D in the general direction of arrow 111. Routing tables associated with the nodes 110A ... 110E are configured to enable the source node 102 to communicate with the destination node 104 over the bearer channel. For example, the bearer channel may be a switched virtual circuit or SVC. The bearer channel, or any other physical link carrying the data traffic, may be referred to as a connection, a datapath or a circuit. It will be appreciated that a logical connection may be referred to as a routing path. In FIG. 2, an alternative datapath is provided by nodes 110A-110E-110D but the links in the alternative datapath are shown as dashed lines to indicate that they are not currently being used.

Each of nodes 110A ... 110E may comprise a call control and processing infrastructure for managing calls and implementing signalling protocols, and a connection manager which is responsible for creating and releasing cross-connects associated with the connection. The call control infrastructure disposed on the nodes communicates over signalling links established between each successive pair of switches along the path of the SVC. Collectively, the call control infrastructure and signalling links compose a signalling network operative to implement a signalling protocol. For example, the ATM Forum Private Network-to-Network Interface (PNNI) may be used, as is well known in the art.

Figure 3:
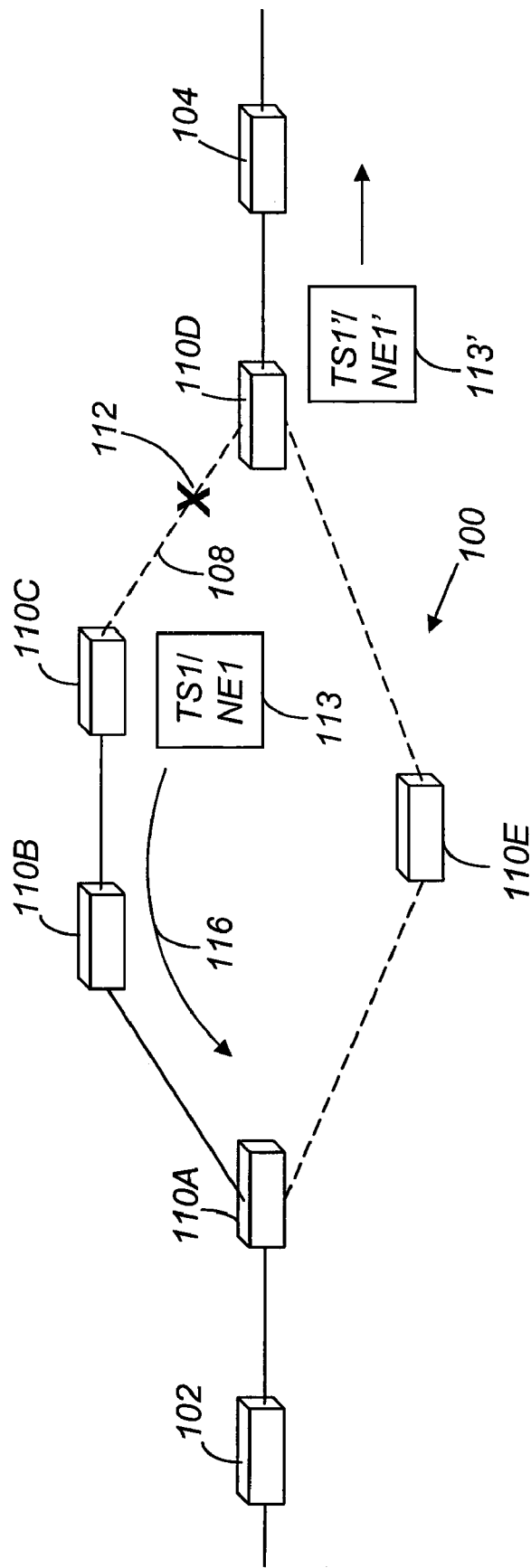
FIG. 3 is the communication network of FIG. 1 in which a service outage has occurred as a result of a failure and a first timestamp is established in accordance with an embodiment.

Now referring to FIG. 3, the communication network of FIG. 1 is shown with a fault 112 that has occurred on a link 108 between nodes 110C and 110D. Accordingly, any data traffic that was being routed through the datapath 110A-110B-110C-110D has been interrupted. In accordance with an embodiment, the time of occurrence of the link fault 112 must be recorded, for example by a data timestamp, substantially contemporaneously with the actual occurrence of the fault 112. In order to avoid problems associated with propagation, queueing and processing delays through the network 100, substantially contemporaneous recording may be achieved by having a node immediately adjacent the link fault 112 (i.e. node 110C) record the time of the fault 112. A network event associated with the fault 112 may also be recorded, as described further below.

By way of example, a timestamp may be a field having a time value therein associated with the event (i.e. fault 112). Alternatively, the timestamp may simply be an event stamp which is sent to a processing system which then associates a time with the event.

In a first embodiment, in order to facilitate electronic timestamping, a network clock is synchronized for all nodes operating in the communication network 100 using an appropriate protocol. By way of example, Network Time Protocol (NTP), as defined by the Internet Engineering Task Force (IETF) in its Request for Comments document RFC-1305, may be used to synchronize time throughout the network 100. Thus, according to the first embodiment, all nodes are synchronized to a common time, i.e. nodes that are physically located in different time zones are synchronized to one and the same network time. For example, and not by way of limitation, the common network time may be based on co-ordinated universal time (UTC), formerly known as Greenwich Mean Time (GMT).

In an alternative embodiment, nodes in a communication network may have different individual times but should be synchronized to the top of the hour, or to the half-hour as the case may be depending on the time zone. In this case, the respective time zones will also be recorded with the timestamp, so that time zone differences can be taken into account when calculating service outage times.

In yet another embodiment, individual clocks in each node need not be synchronized to a common network time, to the top of the hour, or to the half-hour. Rather, each individual clock can keep its own time, but any relative time differences between the individual clocks must be communicated to a central node which co-ordinates time for all the nodes. (This embodiment is described in detail further below with reference to FIG. 4C.)

Still referring to FIG. 3, node 110C adjacent to the fault 112 records a first timestamp TS1 upon initial detection of the fault 112. The fault 112 is detected, for example, when the node 110C detects a physical layer failure. The detection of fault 112 also initiates a release by node 110C, of any calls that were occurring across the datapath 110C-110D at the time of the fault 112, by generating and sending a connection release message 113 upstream to each of its connecting nodes for each connection. It will be appreciated that, in an alternative embodiment, a similar release message may be sent downstream from node 110D in case such a release message is useful for the destination node 104. A release message may be used by destination node 104 in a network comprising multiple networks where multiple SLA are in place. Accordingly, the downstream release message may be used by another service provider.

The connection release message 113 may include a timestamp field in which the timestamp TS1 is inserted (see FIG. 6A, below). The release message 113 and the timestamp TS1 are then sent upstream through the network elements to the originating node 102. (It should be noted that, in an alternative embodiment, a second release message 113' may also be sent from node 110D in the opposite direction in case the release message 113' is useful for the destination node 104. It will be appreciated that this may facilitate calculation of outage times for connections affected by the fault 112 but for data flow travelling in the opposite direction from node 104 towards node 102.)

When the release message 113 is received by the originating node 102, node 102 proceeds to determine a new route (i.e. the alternative datapath 110A-110E-110D) and attempts to re-establish a connection through to destination node 104. Accordingly, once originating node 102 receives the release message 113, it can extract the time of the fault TS1 from the timestamp field of the release message 113.

Still referring to FIG. 3, in an alternative embodiment, the node 110C may also record a first network event NE1 associated with the fault 112. The network event NE1 may provide additional information about the nature and location of fault 112. For example, NE1 may comprise an error code indicating whether the fault 112 is a software error or hardware error, and whether the fault 112 is actually located on the link 108.

In yet another embodiment, any location information provided by the first network event NE1 may be used to determine from which node a subsequent second timestamp TS2 or second network event NE2 (see FIGS. 4A to 4C, below) is extracted and used, as described below. This selection between alternate nodes for retrieving the second timestamp TS2 need not occur immediately, but may be carried out at a later time once the various timestamps have been collected at a central node (see FIG. 4C, below).

Figure 4A:
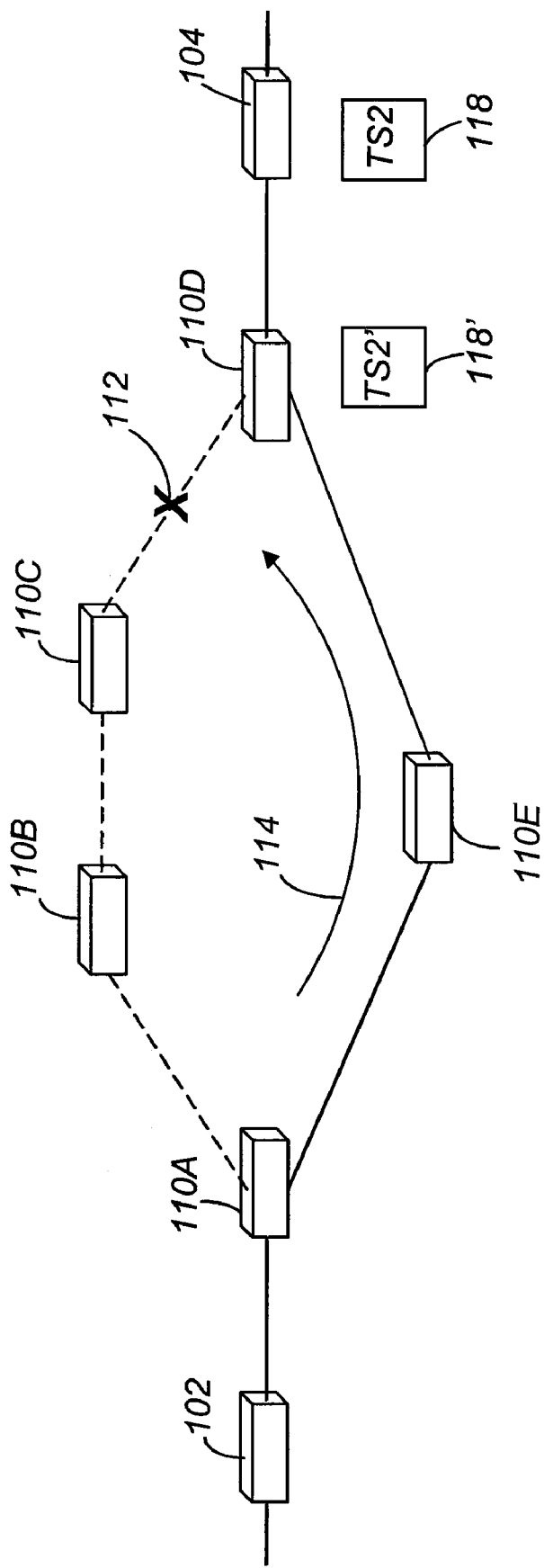
FIG. 4A is the communication network of FIG. 1 in which service has been restored by rerouting data traffic and in which a second timestamp is established in accordance with an embodiment.

Next, referring to FIG. 4A, the communication network of FIG. 1 is shown with data traffic successfully routed through an alternate datapath 110A-110E-110D in the general direction of arrow 114, after the occurrence of fault 112. Once the alternate datapath 110A-110E-110D is established, a connect message 118 (see FIG. 6B, below) confirming the new connection is generated by destination node 104. Upon generation of the connect message 118 confirming the new connection, a second timestamp TS2 is recorded by the destination node 104, using one of the clock embodiments discussed above, in a timestamp field in the connect message 118.

Alternatively, the connect message 118 may be generated by node 110D when the node 110D first recognizes that the datapath 110A-110E-110D is up. Thus, an alternate second timestamp TS2' may be recorded by node 110D for insertion into a timestamp field in an alternate connect message 118'. It will be understood that, for certain network configurations and for certain protocols, recording the second timestamp TS2' at node 110D may more accurately reflect the time at which service is restored for the purposes of calculating service outage time.

From the destination node 104, or a more suitable intermediate node as the case may be (say, for example, node 110D), the connect message 118, 118' containing the second timestamp TS2, TS2' may be sent upstream to the originating node 102, so that the originating node 102 receives both the first timestamp TS1 and the second timestamp TS2, TS2' for calculating the service outage time.

Figure 4B:
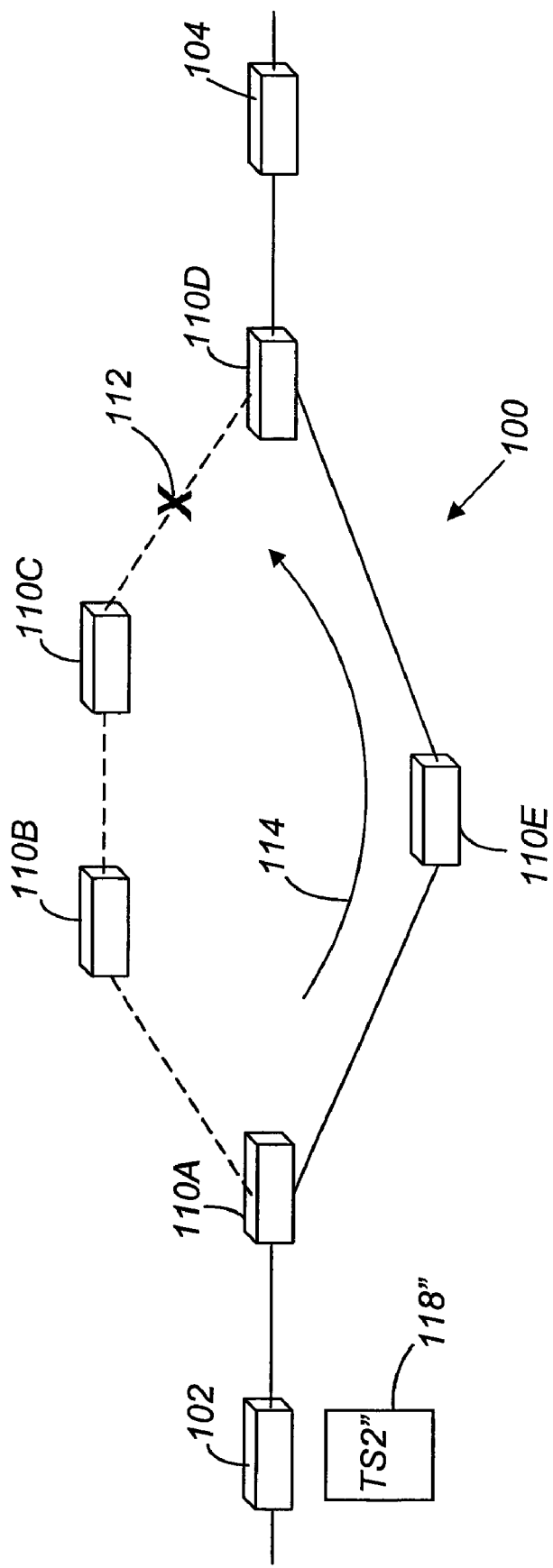
FIG. 4B is the communication network of FIG. 1 in which service has been restored by rerouting data traffic and in which the second timestamp is established in accordance with another embodiment.

Now referring to FIG. 4B, similar to FIG. 4A, the communication network 100 of FIG. 1 is shown with data traffic routed through an alternate datapath 110A-110E-110D in the general direction of arrow 114. However, in this alternative embodiment, a message confirming the new connection is received by the originating node 102, and a second timestamp TS2" is recorded by the originating node 102. This embodiment may be appropriate where, for example, the network protocol dictates that the originating node does not attempt to transmit data until it receives notification that an alternate datapath (i.e. nodes 110A-110E-110D) has been established.

In view of the above examples, it will be appreciated that the selection from which node to extract the second timestamp TS2, TS2', TS2" depends on the particular network configuration and network protocol. In any event, the second timestamp TS2, TS2', TS2" should reflect as closely as possible the actual time of service restoration in the network 100.

In an alternative embodiment, it is possible that the selection of the node at which the second timestamp TS2 is recorded may be based on the nature and location of the fault 112. Such information may be recorded, for example, as a first network event NE1 in conjunction with the first timestamp TS1 Now referring to FIG. 4C, there is shown a network management station or a collection/control node 115 which is connected to other nodes 102, 110A, 110B, 110C, 110D, 110E, 104 in the communication network 100 by means of communication links 117. Alternatively, the collection/control node 115 may be another node in the communication network 100 connected through various links 108.

The communication links 117 provide a communication path for timestamps TS1, TS2, TS2', TS2" and network events NE1, NE2, etc. to be uploaded to the control node 115 from each of the other nodes 102, 110A, 110B, 110C, 110D, 110E, 104. As previously discussed, in a possible embodiment, the individual nodes 102, 110A, 110B, 110C, 110D, 110E, 104 need not be synchronized to a common network time. Rather, the control node 115 may be adapted to coordinate the relative time differences between the individual time clocks in nodes 102, 110A, 110B, 110C, 110D, 110E, 104 and to take such relative time differences into account when computing service outage times based on timestamps TS1, TS2, TS2', TS2" received from the nodes 102, 110A, 110B, 110C, 110D, 110E, 104.

Advantageously, the control node 115 provides a dedicated resource for co-ordinating the time clocks and calculating the service outage times, thus reducing overhead on individual nodes in the network. Furthermore, uploading network events NE1, NE2 to the control node 115 allows the control node 115 to provide more detailed information regarding each service outage and may even allow the control node 115 to select from which node an appropriate second timestamp TS2, TS2', TS2" should be extracted for calculation of the service outage time.

Figure 4C:
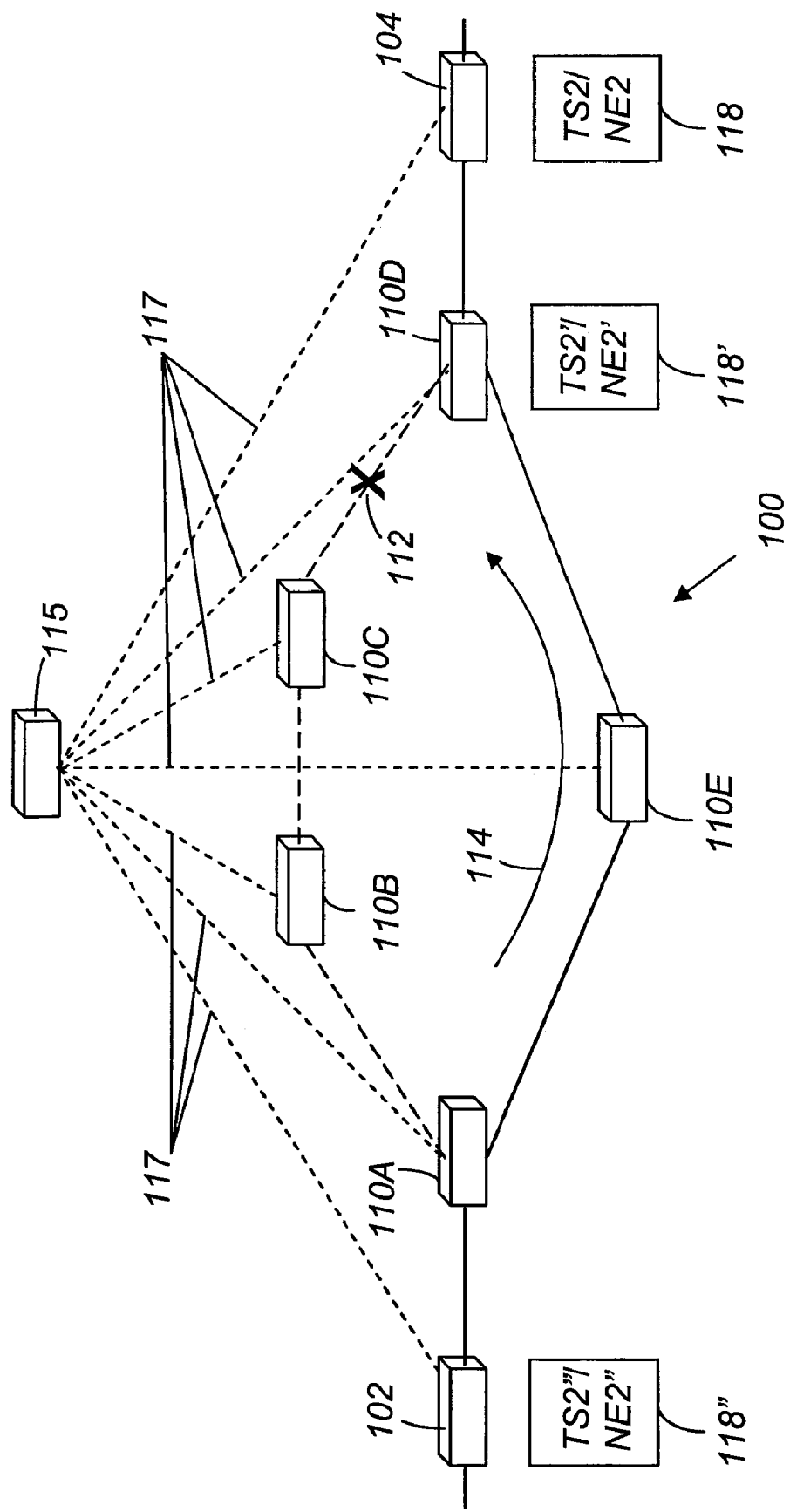
FIG. 4C is the communication network of FIG. 1 further including a collecting node for collecting service availability data.

Still referring to FIG. 4C, in large networks, it may not be possible for the control node 115 to have a dedicated communication link 117 to every other node. In this case, the control node 115 may simply be another node in the communication network 100 having a specialized function, and having datapaths to the other nodes 102, 110A, 110B, 110C, 110D, 110E, 104 through various links 108. As the timestamps TS1, TS2, TS2', TS2" should record, as closely as possible, the actual time of occurrence of the fault 112 and the actual time of restoration of service, it will be understood that any propagation, processing and queuing delay through the network 100 from the various nodes 102, 110A, 110B, 110C, 110D, 110E, 104 to the control node 115 should not affect the calculation of service outage times based on the timestamps TS1, TS2, TS2', TS2".

Figure 5:
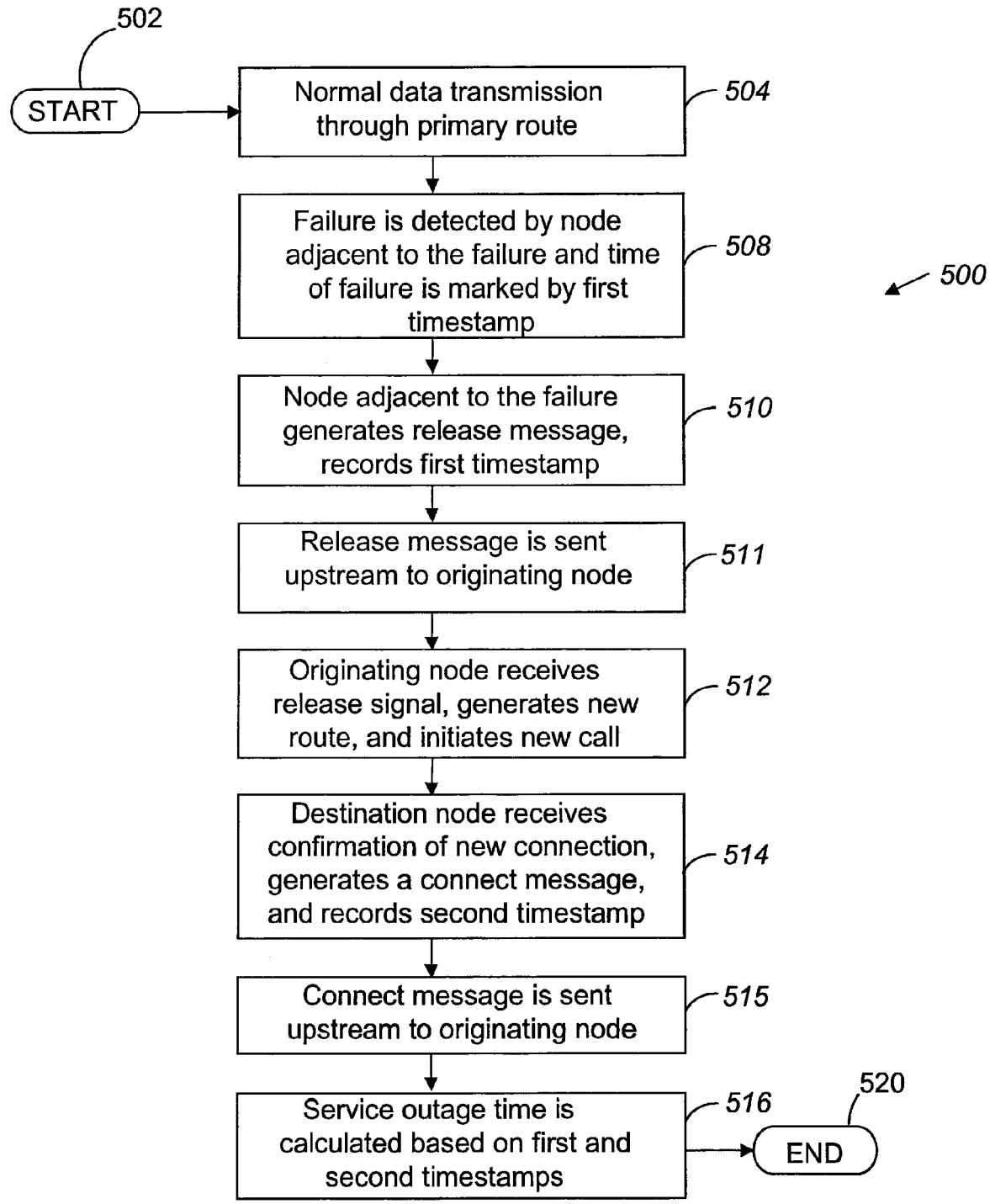
FIG. 5 is a flowchart showing the process for providing service availability data in accordance with an embodiment.

Now referring to FIG. 5, generally indicated by reference numeral 500 is an example of a process for timestamping and calculating service level performance data in accordance with an embodiment of the invention. Starting at block 502, the process 500 enters block 504 in which normal data transmission is taking place through a primary route (i.e. route 110A-110B-110C-110D as previously described with reference to FIG. 2). Process 500 then waits at block 508 until a failure is detected by a node adjacent to the failure. Contemporaneously, a first timestamp TS1 is recorded. This condition was shown previously in FIG. 3. In the example shown in FIG. 3, node 110C is the node immediately adjacent to the link failure 112. Node 110C records the time that it detects the failure 112 with a first timestamp TS1 using one of the timing protocols, for example NTP, as described above. Thus, TS1 indicates the time at which service is first interrupted.

The process 500 then proceeds to block 510 where the adjacent node 110C generates a release message 113 (FIG. 3, above), and sends this release message 113 together with TS1 upstream towards the originating node 102, in the general direction of arrow 116 (FIG. 3, above). Each of nodes 110A and 110B also receive the release message 113 and TS1 en route back to the originating node 102. While the network 100 shown by way of example in FIGS. 1-4 has been simplified for clarity, it will be understood that nodes 110A and 110B may be originating nodes for other channels (connected by nodes and links not shown) and may make use of the release message 113 and the first timestamp TS1.

The process 500 then proceeds to block 512 where, upon receipt of the release message 113, the originating node 102 sets up a new connection and initiates a new call. By way of example, FIG. 4A shows the establishment of an alternate route (110A-110E-110D) from the originating node 102 to the destination node 104.

The process 500 then proceeds to block 514 where the destination node 104 receives confirmation of the new connection (i.e. the alternate route) as it begins to receive data from the originating node 102 (through node 110D). Upon establishment of the new connection, the destination node 104 generates a connect message 118 (FIG. 4A) and records a second timestamp TS2 using the common network clock described above. Thus, TS2 indicates the time at which the destination node 104 recognizes that service from the originating node 102 has resumed.

Next, the process 500 proceeds to block 515 where the connect message 118 is sent upstream to the originating node 102. The process 500 then proceeds to block 516 wherein the process 500 calculates the total service outage time based on TS1 and TS2 (extracted from the release message 113 and connect message 118, respectively). If an absolute time clock has been used, such as UTC, the service outage time is calculated as TS2-TS1. If relative time clocks have been used together with information on the relative time zones of the nodes, then the difference in time zones must be taken into account in the calculation. For example, the timestamps TS1 and TS2 may be converted to UTC before calculating TS2-TS1. While the calculation of the service outage time may take place on the originating node 102, in a preferred embodiment, TS1 and TS2 are communicated to a separate network element (collection node 115 of FIG. 4C) that receives such timestamp information and calculates the service outage times as described above. In a preferred embodiment, the service availability data based on the time stamps TS1, TS2 is calculated for each particular customer connection with whom a service provider has an SLA.

As described earlier, in an alternative embodiment, the second time stamp TS2 need not be recorded at the destination node 104. Rather, an alternate second timestamp TS2' may be recorded at a more suitable intermediate node (e.g. node 10D of FIG. 4B) so that the second timestamp TS2' is more reflective of the actual time of restoration of service. In this case, alternatively, the first time stamp TS1 may be sent towards the intermediate node 110D instead of the originating node 102 so that node 110D is instead responsible for performing the actual reporting of outage time based on TS1 and TS2'.

In yet another embodiment, the second timestamp TS2" may be recorded at the originating node 102 itself, should this more closely reflect the actual time of restoration of service. As noted above, this last mentioned embodiment may be most suitable if the network protocol dictates that data cannot be sent until the originating node itself receives the connect message.

Significantly, the embodiment described above records the first timestamp TS1 at the time a node immediately adjacent to a failure detects the failure. This insures an accurate service outage start time which is consistent for all connections affected by the particular network failure, regardless of any potential propagation, queuing or processing delays in the network 100. Furthermore, the second timestamp TS2 is recorded at a time an affected node receives confirmation of a new connection. As explained with reference to FIG. 4A, above, a unique 'second' timestamp TS2, TS2' may be recorded at each node affected by the failure such that there are a plurality of second timestamps TS2, TS2' in the network 100. As noted earlier, selection of which node to extract the second timestamp from may be based on the particular network configuration and network protocol, such that the second timestamp TS2, TS2' most closely reflects the actual time of restoration of service. Consequently, the calculation according to the embodiment is designed to accurately reflect the actual amount of time that service is disrupted in the network 100 for a particular connection originating at a particular node, and ending at a particular destination node.

Advantageously, in a large communication network, the recording of TS1 by a node immediately adjacent to a failure provides a more accurate timestamp than propagating a failure signal across multiple network elements between the failure and the originating node and then recording the time of receipt of the failure signal. Also, the recording of TS2 at a suitably chosen affected node, upon recognition of a new connection by that affected node, accurately reflects the time at which service can actually resume. Thus, it will be appreciated that the system and method of the embodiment is scalable to virtually any size of a communication network, regardless of propagation, queuing and processing delays, representing as closely as possible the actual length of time of a service disruption.

Furthermore, the embodiment may make use of an empty field in a release message 113 which does not require separate processing and transmission of TS1. For example, as shown in FIG. 6A, the release message may have a standard IE (information element) defined in terms of type, length and value, and TS 1 may be inserted into such an empty field. In FIG. 6A, the empty field for inserting a timestamp is identified by reference numeral 610A. Various other fields 602A, 604A, 606A, 608A, 612A may include information relating to message type, network call ID, cause code, network event code, and vendor specific code, etc.

Any overhead traffic in the network 100 associated with the embodiment is designed to be minimized, as the release message 113 is typically already a part of the network protocol. By way of example, the release message in the ATM Forum PNNI protocol includes an IE to which vendor specific sub-IE's may be added.

Correspondingly, as shown in FIG. 6B, the embodiment may make use of an available empty field (timestamp field 610B in FIG. 6B) in the connect message 118 to insert TS2. The connect message 118 may also have various other fields 602B, 604B, 606B, 608B, which include information relating to message type, network call ID, cause code, and network event code, etc. By way of example, the connect message in the ATM Forum PNNI protocol may be used for this purpose, similar to the release message described above.

It is noted that those skilled in the art will appreciate that various modifications of detail may be made to the present embodiment, all of which would come within the scope of the invention.

We claim:

1. A method for determining an effective outage time for a connection in a switched communication network comprising a plurality of nodes interconnected by links, and wherein a source node establishes said connection between said source node and a destination node along a first route via a plurality of intermediate nodes, comprising:

said plurality of intermediate nodes monitoring said connection for faults occurring in said links, and wherein when a fault is detected on a link, a first intermediate node of said plurality of intermediate nodes, which said first intermediate node is adjacent and upstream of the link on which the fault was detected, sends a release message back to the source node requesting the source node to release said connection and establish a new connection over an alternate route to said destination node;

said first intermediate node recording a first timestamp indicating a time said fault was detected by said first intermediate node;

said first intermediate node including said first timestamp in said release message;

said source node initiating, in response to receipt of said release message, setup of said new connection rerouting traffic carried by said connection via said alternate route;

said destination node in response to establishment of said new connection sending an acknowledgement message upstream from said destination node back to said source node indicating that said new connection has been established;

generating a second timestamp upon establishment of said new connection; and determining said effective outage time from said first and second timestamps.

2. A method as claimed in claim 1, wherein said first and second timestamps are synchronized to a common network time utilized by said switched communication network and said effective outage time is determined from a difference between said first timestamp and said second timestamp.

3. A method as claimed in claim 1, wherein said first and second timestamps are synchronized according to a local time zone associated with a common network time.

4. The method of claim 1, wherein said second timestamp is generated at said source node upon receipt of said acknowledgment message from said destination node confirming the new connection received by said source node.

5. The method of claim 1, further comprising recording additional information about said failure and transmitting said additional information to a network management station or a collection node of said switched communication network.

6. The method of claim 1, wherein said second timestamp is generated at said destination node upon receipt of a connect message from said source node and inserted in said acknowledgement message sent to said source node.

7. The method of claim 1, wherein said second timestamp is generated at said destination node in response to said destination node recognizing that said new connection is operational and said timestamp is inserted in said acknowledgement message sent to said source node.

8. A method as claimed in claim 2, wherein, said common network time is co-ordinated universal time (UTC).

9. A method as claimed in claim 3, further comprising:
converting said first and second timestamps to a common time format relating to said common network time; and, determining said effective outage time as a difference between said first and second timestamps as converted to said common time format.

10. A method as claimed in claim 9, wherein, said common network time is co-ordinated universal time (UTC).

11. A method of calculating an effective outage time related to establishing a new connection between an originating node and a destination node in a switched communication network comprising a plurality of nodes after a previously established connection between said originating node and said destination node via intermediate nodes has had a failure, said method comprising the steps of:
  (i) an adjacent node to said failure in said previously established connection recording, in response to the detection of said failure, a first timestamp corresponding to a time of detection of said failure by said adjacent node in said previously established connection;
  (ii) said adjacent node, in response to detection of said failure, transmitting said first timestamp to a control node in said switched communication network;
  (iii) rerouting said previously established connection over said new connection via a different route through said switched communication network;
  (iv) recording a second timestamp corresponding to a time of completion of establishment of said new connection at a node in said new connection, wherein said time of completion of establishment of said new connection comprises a time of receipt of a connect message corresponding to completion of said new connection;
  (v) uploading said second timestamp to said control node; and
  (vi) said control node calculating said effective outage time from said first and second timestamps.

* * * * *